United States Patent
Lun

(10) Patent No.: US 9,334,917 B2
(45) Date of Patent: May 10, 2016

(54) SUSPENSION DAMPER ASSEMBLY

(75) Inventor: Saiman Lun, Centerville, OH (US)

(73) Assignee: Beijing West Industries Co., Ltd., Beijing (CN)

( * ) Notice: Subject to any disclaimer, the term of this patent is extended or adjusted under 35 U.S.C. 154(b) by 0 days.

(21) Appl. No.: 14/350,540

(22) PCT Filed: Jul. 4, 2012

(86) PCT No.: PCT/CN2012/078182
§ 371 (c)(1),
(2), (4) Date: Apr. 8, 2014

(87) PCT Pub. No.: WO2013/177844
PCT Pub. Date: Dec. 5, 2013

(65) Prior Publication Data
US 2015/0300441 A1     Oct. 22, 2015

Related U.S. Application Data

(60) Provisional application No. 61/653,104, filed on May 30, 2012.

(51) Int. Cl.
*F16F 9/092* (2006.01)
*F16F 9/06* (2006.01)
*F16F 9/08* (2006.01)

(52) U.S. Cl.
CPC .................. *F16F 9/092* (2013.01); *F16F 9/062* (2013.01); *F16F 9/067* (2013.01); *F16F 9/066* (2013.01); *F16F 9/081* (2013.01)

(58) Field of Classification Search
CPC ........... F16F 9/092; F16F 9/062; F16F 9/066; F16F 9/081
See application file for complete search history.

(56) References Cited

U.S. PATENT DOCUMENTS

| 3,151,706 | A | * | 10/1964 | Dillenburger | ...... B60G 17/0416 |
| | | | | | 188/269 |
| 3,371,751 | A | | 3/1968 | Dickinson | |
| 3,527,451 | A | * | 9/1970 | Long, Jr. | ................... F16F 9/08 |
| | | | | | 188/315 |
| 3,771,626 | A | * | 11/1973 | Palmer | ...................... F16F 9/18 |
| | | | | | 188/298 |

(Continued)

FOREIGN PATENT DOCUMENTS

| CN | 201249758 Y | 6/2009 |
| CN | 201380843 Y | 1/2010 |

(Continued)

OTHER PUBLICATIONS

International Search Report, Feb. 19, 2013, 2 pages.

*Primary Examiner* — Thomas Irvin
(74) *Attorney, Agent, or Firm* — Dickinson Wright PLLC

(57) ABSTRACT

The present invention provides a damping device and a method for assembling the damping device. The damping device includes an outer tube and an inner tube disposed concentrically along a center axis defining a chamber, with a diaphragm located between the inner tube and outer tube dividing the chamber. A gas charge seal is secured over the chamber between the outer tube and inner tube. An inner clamp is in a sealing engagement with the inner tube and holds the diaphragm in place. A waist defines a sealing surface adjacent to outer tube. The diaphragm extends from under the inner clamp and through a "U" shaped turn back towards the waist. An upper clamp axially aligns with the waist and holds the diaphragm into the waist of the outer tube, sealing the diaphragm to the outer tube.

7 Claims, 2 Drawing Sheets

(56) References Cited

U.S. PATENT DOCUMENTS

| | | | | |
|---|---|---|---|---|
| 3,798,744 | A * | 3/1974 | Smith | F16F 9/43 188/298 |
| 3,837,444 | A * | 9/1974 | Allinquant | F16F 9/092 188/269 |
| 3,874,485 | A * | 4/1975 | Smith | F16F 9/43 188/298 |
| 4,105,193 | A * | 8/1978 | Long, Jr. | B60G 15/12 188/315 |
| 5,575,360 | A * | 11/1996 | Gubitz | F16F 9/05 188/298 |
| 5,878,852 | A * | 3/1999 | Masamura | B60G 17/044 188/289 |
| 6,161,662 | A * | 12/2000 | Johnston | F16F 9/5123 188/282.3 |
| 6,695,105 | B2 * | 2/2004 | Toiyama | F16F 9/43 188/298 |
| 6,974,003 | B1 * | 12/2005 | Acker | F16F 9/096 188/297 |
| 7,025,184 | B2 * | 4/2006 | Baba | F16F 9/092 188/315 |
| 8,146,721 | B2 * | 4/2012 | Kim | B60G 17/08 188/315 |
| 8,267,382 | B2 * | 9/2012 | Yazaki | F16F 9/092 141/349 |
| 8,556,048 | B2 * | 10/2013 | Maeda | B60G 17/08 188/315 |
| 2003/0019701 | A1 * | 1/2003 | Hodgson | F16F 9/0472 188/298 |
| 2004/0262107 | A1 * | 12/2004 | Nandyal | F16F 9/092 188/314 |
| 2005/0166748 | A1 | 8/2005 | Schramm et al. | |
| 2008/0185244 | A1 * | 8/2008 | Maeda | B60G 17/08 188/316 |
| 2009/0107780 | A1 * | 4/2009 | Yazaki | F16F 9/092 188/269 |
| 2009/0223761 | A1 * | 9/2009 | Kim | B60G 17/08 188/315 |

FOREIGN PATENT DOCUMENTS

| | | |
|---|---|---|
| CN | 101844555 A | 9/2010 |
| CN | 102050101 A | 5/2011 |
| CN | 102155513 | 8/2011 |
| CN | 203472841 U | 3/2014 |
| DE | 20115980 | 12/2001 |
| JP | 2011027255 | 2/2011 |

* cited by examiner

SUSPENSION DAMPER ASSEMBLY

BACKGROUND OF THE INVENTION

1. Field of the Invention

The present invention relates generally to a suspension damper assembly for use in an automotive shock absorber and a method for assembling the suspension damper.

2. Description of the Prior Art

A suspension damper of the type to which the subject invention pertains is illustrated in U.S. Pat. App. No. 2003/0019701 filed by Hodgson wherein an outer tube of cylindrical shape defines an outer tube inner wall and an outer tube outer wall and the outer tube extends concentrically about a center axis between an open end and a closed end. An inner tube of cylindrical shape defines an inner tube inner wall and an inner tube outer wall, the inner tube being disposed concentrically about the center axis and within the outer tube along the center axis between a first end and a second end. An annular flange disposed on the open end of the outer tube extends radially inwardly toward and perpendicular to the center axis to define an opening to the inner tube at the first end thereof.

The application further discloses the inner tube inner wall being spaced radially from the center axis to define a hydraulic chamber of cylindrical shape, and the inner tube outer wall being spaced radially from the outer tube inner wall to define a diaphragm chamber of cylindrical shape between the inner tube outer wall and the outer tube inner wall. A diaphragm of cylindrical shape is disposed concentrically between the inner tube outer wall and the outer tube inner wall along the center axis to divide the diaphragm chamber into a high pressure gas chamber disposed between the diaphragm and the inner tube outer wall and a fluid chamber disposed between the diaphragm and the outer tube inner wall. A gas charge seal is disposed annularly in the high pressure gas chamber to engage the inner tube outer wall and the outer tube inner wall at the second end of the inner tube.

The application further discloses a cap engaging the closed end of the outer tube to seal the closed end and an inner tube base of cylindrical shape defines an outer periphery disposed in the first end of the inner tube to engage the cap at the closed end of the outer tube. The inner tube base defines a central cavity of hollow cylindrical shape disposed concentrically in the inner tube base and open to the hydraulic chamber and closed by the cap. The inner tube base further defines a plurality of radially disposed channels extending perpendicular to the center axis between the central cavity and the fluid chamber for establishing fluid communication between the hydraulic chamber and the fluid chamber.

The application further discloses a piston disposed in sliding and sealing engagement with the inner tube inner wall in the hydraulic chamber, a rod guide of cylindrical shape defining an axial bore is disposed in the open end and in sealing engagement with the inner tube inner wall, and a piston rod extends along the center axis and through the bore in the rod guide and connects to the piston for movement therewith. The U.S. Pat. No. 7,226,045 to Brookes discloses an inner clamp of annular shape holding the diaphragm radially inwardly into sealing engagement with the inner tube outer wall.

The U.S. Pat. No. 4,392,293 to Yamaguchi et al. discloses a method of assembly of a diaphragm apparatus comprising the steps of disposing one end of the diaphragm over the first end of the inner tube, sealing the diaphragm to the inner tube outer wall adjacent the first end thereof to define an inner seal, rolling the diaphragm over the inner seal and towards the second end of the inner tube, and finally inserting the inner tube and the diaphragm into the open end of the outer tube.

SUMMARY OF THE INVENTION AND ADVANTAGES

The subject invention provides such an assembly wherein the diaphragm extends from under the inner clamp and through a 'U' shaped turn back toward the open end along outer tube inner wall and an upper clamp of annular shape holds the diaphragm into the outer tube inner wall to seal the diaphragm to the outer tube inner wall. The invention also provides a method of assembling such a damper by sealing the diaphragm to the outer tube inner wall adjacent to the second end of the inner tube.

The subject invention provides for a damper assembly having improved packaging and without any remote reservoir. Additionally, the high pressure gas chamber can be filled after the damper apparatus has been assembled.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
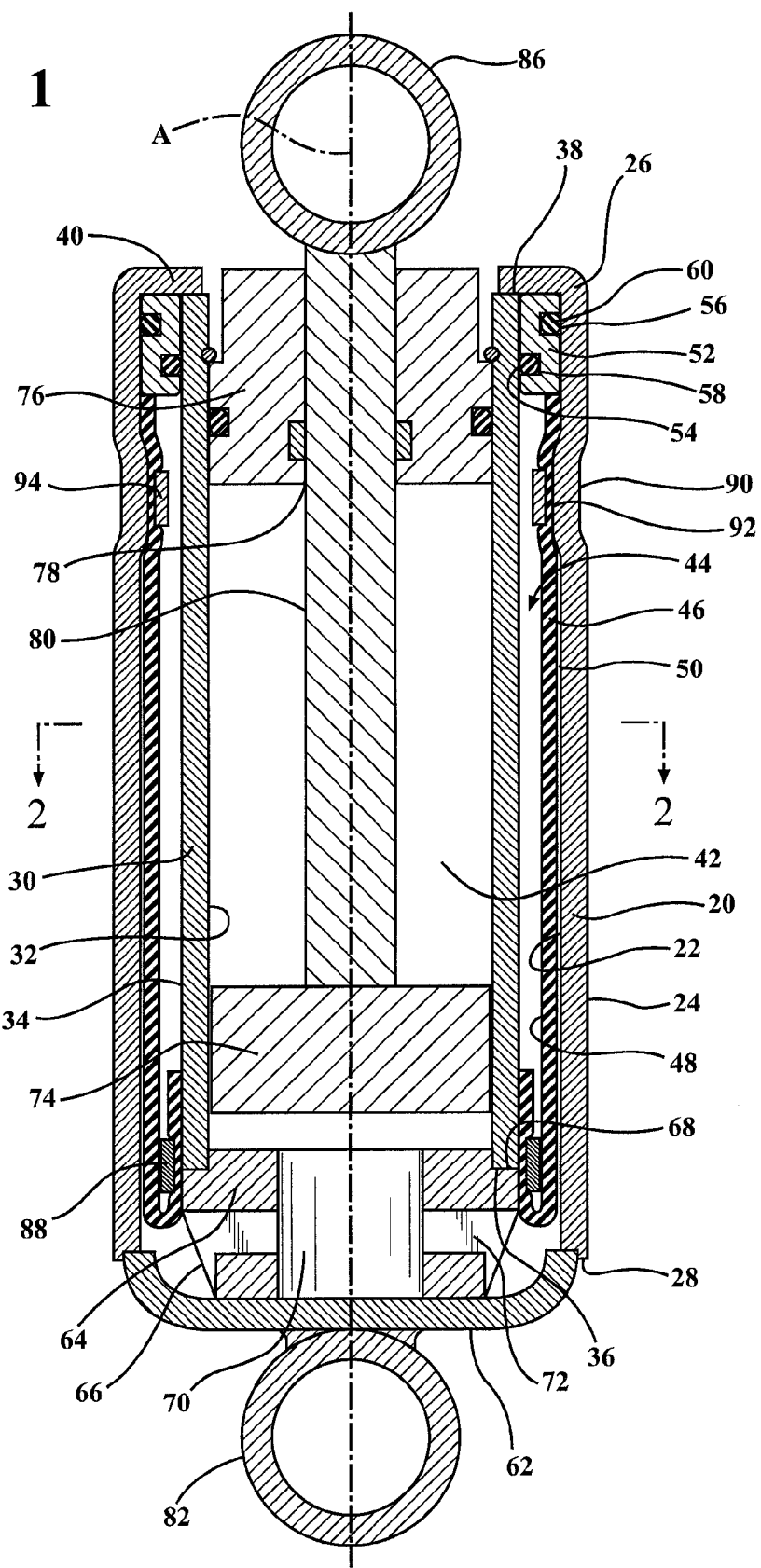
FIG. 1 is a front elevational view showing the suspension damper assembly of the subject invention.
Figure 2:
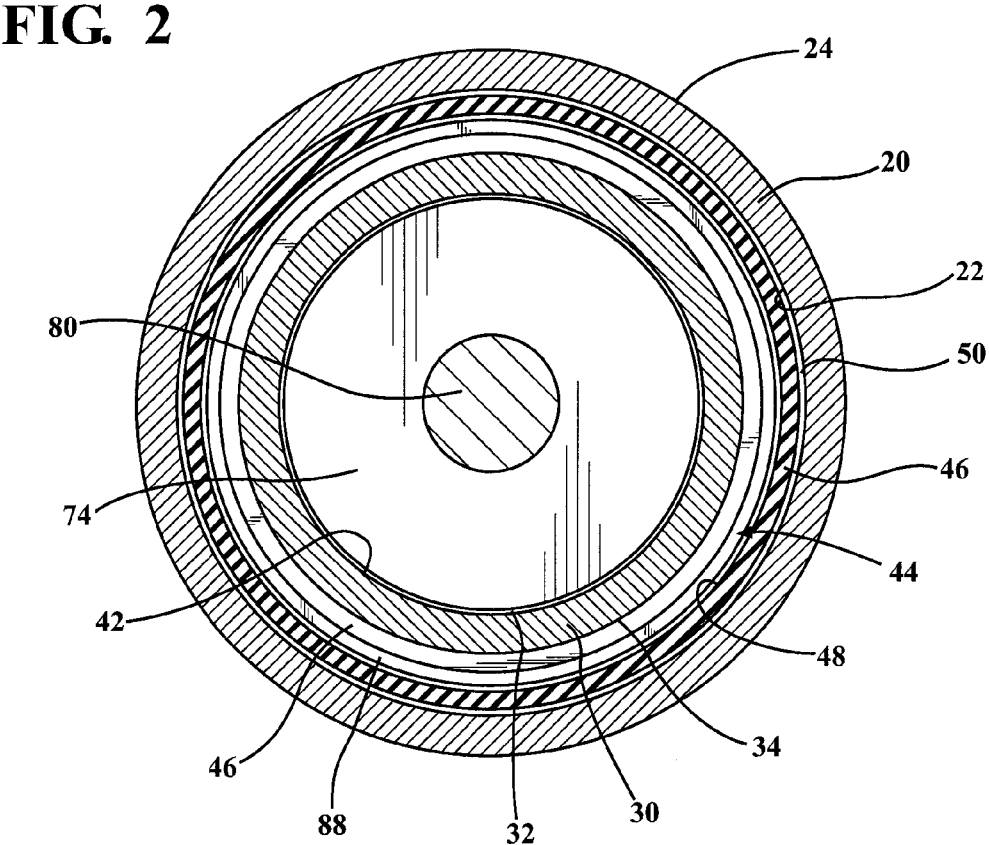
FIG. 2 is a cross-sectional top view of the suspension damper assembly of the subject invention along line 2-2.
Figure 3:
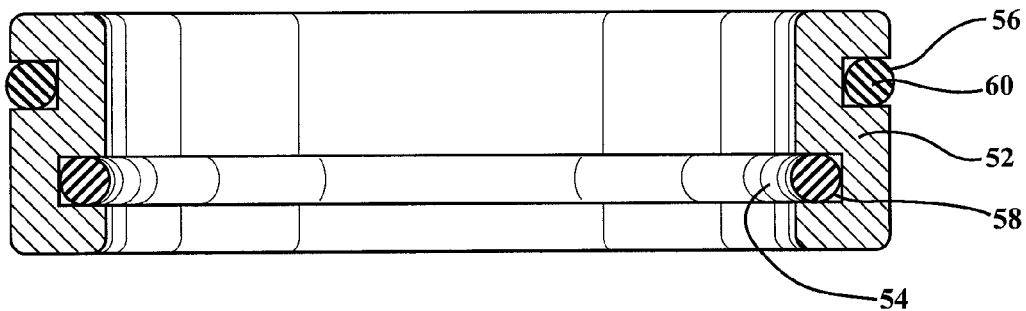
FIG. 3 is a top cross-sectional view of the gas charge seal.

Referring to the Figures, wherein like numerals indicate corresponding parts throughout the several views, a suspension damper assembly for an automotive shock absorber constructed in accordance with the subject invention is shown generally in FIGS. 1 and 2.

A suspension damper for an automotive shock absorber includes an outer tube 20 generally having a cylindrical shape defining an outer tube inner wall 22 and an outer tube outer wall 24. The outer tube 20 extends concentrically about a center axis A between an open end 26 and a closed end 28. An inner tube 30 generally having a cylindrical shape defining an inner tube inner wall 32 and an inner tube outer wall 34 is disposed concentrically inside the outer tube 20 along the center axis A between a first end 36 and a second end 38. The outer tube 20 has an annular flange 40 disposed on the open end 26, and the annular flange 40 extends radially inwardly toward and perpendicular to the center axis A to define an opening to the inner tube 30 at the first end 36 thereof.

The inner tube inner wall 32 is spaced radially from the center axis A defining a hydraulic chamber 42 generally having a cylindrical shape. The inner tube outer wall 34 is spaced radially from the outer tube inner wall 22 defining a diaphragm chamber 44 of cylindrical shape. A diaphragm 46 generally having a cylindrical shape is disposed concentrically between the inner tube outer wall 34 and the outer tube inner wall 22 along the center axis A inside the diaphragm chamber 44. The diaphragm 46 divides the diaphragm chamber 44 into two separate chambers, a high pressure gas chamber 48 disposed between the diaphragm 46 and the inner tube outer wall 34 and a fluid chamber 50 disposed between the diaphragm 46 and the outer tube inner wall 22. Alternatively, instead of rubber, the diaphragm 46 could be made of any other gas impermeable elastomer.

A gas charge seal 52 generally having a 'S' shape is disposed annularly in the high pressure gas chamber 48 and abuts the annular flange 40. In an embodiment, the gas charge seal is an o-ring or other seal ring. The gas charge seal 52 engages the inner tube outer wall 34 and the outer tube inner wall 22 at the second end 38 of the inner tube 30. The 'S' shape of the gas charge seal 52 defines an inward groove 54 opening annularly to the inner tube outer wall 34 as well as an outward groove 56 opening annularly to the outer tube inner wall 22. A first annular seal 58 is disposed in the inward groove 54 in sealing engagement with the inner tube outer wall 34, and a second annular seal 60 is disposed in the outward groove 56 in sealing engagement with the inner tube outer wall 34.

A cap 62 engages the closed end 28 of the outer tube 20, sealing the closed end 28 of the outer tube 20. An inner tube base 64 of cylindrical shape defines an outer periphery 66 being disposed in the first end 36 of the inner tube 30 and engages the cap 62 at the closed end 28 of the outer tube 20. The inner tube base 64 defines an annular shoulder 68 receiving and abutting the first end 36 of the inner tube 30 with the outer periphery 66 of the inner tube base 64 being concentric with the inner tube outer wall 34. The inner tube base 64 further defines a central cavity 70 of hollow cylindrical shape being disposed concentrically in the inner tube base 64. The inner tube base 64 allows fluid communication between the hydraulic chamber 42 and the fluid chamber 50 by use of a plurality of radially disposed channels 72 extending perpendicular to the center axis A between the central cavity 70 and the fluid chamber 50. The inner tube base 64 is closed and sealed by the cap 62. Alternatively, instead of using the cap 62, a base cup could be used.

A piston 74 is disposed in sliding and sealing engagement with the inner tube inner wall 32 within the hydraulic chamber 42, and a rod guide 76 of cylindrical shape defines an axial bore 78 being disposed in the open end 26. The rod guide 76 is in a sealing engagement with the inner tube inner wall 32, with a piston rod 80 connected to the piston 74 and extending along the center axis A and through the bore in the rod guide 76.

A lower mounting member 82 with a ring shape is disposed along the center axis A on the closed end 28 of the outer tube 20 and connected to the cap 62. The lower mounting member 82 receives a mounting device. An upper mounting member 86 with a ring shape is disposed along the center axis A on the piston rod 80 receiving a mounting device. In an embodiment, the upper mounting member 86 can be secured to the piston rod 80 by screwing or welding the upper mounting member 86 to the piston rod 80.

The diaphragm 46 is held in place radially inwardly by an inner clamp 88 of annular shape in a sealing engagement with the inner tube outer wall 34. The inner clamp 88 axially overlaps the first end 36 of the inner tube 30 and the tube base at the shoulder 68 of the inner tube base 64. A radially inwardly disposed waist 90 defines an annular projection of the outer tube 20 extending radially inwardly to define a sealing surface 92 adjacent to the open end 26 of the outer tube 20. The diaphragm 46 extends from under the inner clamp 88 and through a 'U' shaped turn back toward the open end 26 along outer tube inner wall 22 and over the waist 90. An upper clamp 94 of annular shape axially aligns with the waist 90 and holds the diaphragm 46 into the waist 90 of the outer tube inner wall 22, sealing the diaphragm 46 to the outer tube inner wall 22.

The subject invention also includes a method for assembling a suspension damper for an automotive shock absorber comprising a first step of pressing the inner tube 30 onto the inner tube base 64 containing the central cavity 70 about the first end 36 of the inner tube 30, fitting one end of the diaphragm 46 over the inner tube outer wall 34 about the first end 36 of the inner tube 30. The fabrication continues by sealing the diaphragm 46 to the inner tube outer wall 34 adjacent the first end 36 by use of an inner clamp 88 defining an inner seal placed on the shoulder 68 between the inner tube 30 and the inner tube base 64. This seals the high pressure gas chamber 48 about the first end 36 of the inner tube 30.

The diaphragm 46 is then pulled or rolled up the inner tube outer wall 34 over the inner clamp 88 and towards the second end 38 of the inner tube 30. The inner tube 30 the inner tube base 64 and the secured diaphragm 46 are inserted into the open end 26 of the outer tube 20. The closed end 28 of the outer tube 20 engages the cap 62, sealing the closed end 28 of the outer tube 20.

The upper clamp 94 is lowered into the diaphragm chamber 44 from the open end 26 of the outer tube 20 between the diaphragm 46 and the inner tube outer wall 34. The upper clamp 94 is fitted to the diaphragm 46, separating the high pressure gas chamber 48 from the fluid chamber 50 inside the diaphragm chamber 44. A crimp force is applied to the outer tube outer wall 24 compressing the outer tube 20 and diaphragm 46 against the upper clamp 94 sealing the high pressure chamber at the open end 26. The crimp force creates the waist 90 in the outer tube 20 about the open end 26.

The piston 74 and piston rod 80 are installed in the inner tube inner wall 32 and the hydraulic chamber 42 is filled with a hydraulic fluid. The rod guide 76 is installed over the piston rod 80 and encloses the hydraulic chamber 42. The high pressure gas chamber 48 is charged with a high pressure fluid then sealed by securing a gas charge seal 52 to the open end 26 of the diaphragm chamber 44. In an embodiment, the high pressure fluid is nitrogen. The diaphragm chamber 44 is then closed by rolling the annular flange 40 of the outer tube 20 inwardly to abut the inner tube 30 and the gas charge seal 52.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

ELEMENT LIST

| Element Symbol | Element Name |
| --- | --- |
| A | center axis |
| 20 | outer tube |
| 22 | outer tube inner wall |
| 24 | outer tube outer wall |
| 26 | open end |
| 28 | closed end |
| 30 | inner tube |
| 32 | inner tube inner wall |
| 34 | inner tube outer wall |
| 36 | first end |
| 38 | second end |
| 40 | annular flange |
| 42 | hydraulic chamber |
| 44 | diaphragm chamber |
| 46 | diaphragm |
| 48 | high pressure gas chamber |
| 50 | fluid chamber |

-continued

ELEMENT LIST

| Element Symbol | Element Name |
| --- | --- |
| 52 | gas charge seal |
| 54 | inward groove |
| 56 | outward groove |
| 58 | first annular seal |
| 60 | second annular seal |
| 62 | cap |
| 64 | inner tube base |
| 66 | outer periphery |
| 68 | shoulder |
| 70 | central cavity |
| 72 | channels |
| 74 | piston |
| 76 | rod guide |
| 78 | axial bore |
| 80 | piston rod |
| 82 | lower mounting member |
| 86 | upper mounting member |
| 88 | inner clamp |
| 90 | waist |
| 92 | sealing surface |
| 94 | upper clamp |

What is claimed is:

1. A suspension damper assembly for an automotive shock absorber comprising;

an outer tube of cylindrical shape having an outer tube inner wall and an outer tube outer wall and extending concentrically about a center axis between an open end and a closed end, an inner tube of cylindrical shape having an inner tube inner wall and an inner tube outer wall and disposed concentrically about said center axis and disposed concentrically in said outer tube along said center axis between a first end and a second end, an annular flange disposed on said open end of said outer tube extending radially inwardly toward and perpendicular to said center axis to define an opening to said inner tube at said first end thereof, said inner tube inner wall being spaced radially from said center axis to define a hydraulic chamber of cylindrical shape, said inner tube outer wall being spaced radially from said outer tube inner wall to define a diaphragm chamber of cylindrical shape between said inner tube outer wall and said outer tube inner wall, a diaphragm of cylindrical shape disposed concentrically between said inner tube outer wall and said outer tube inner wall along said center axis for dividing said diaphragm chamber into a high pressure gas chamber disposed between said diaphragm and said inner tube outer wall and a fluid chamber disposed between said diaphragm and said outer tube inner wall, a gas charge seal disposed annularly in said high pressure gas chamber engaging said inner tube outer wall and said outer tube inner wall at said second end of said inner tube, a cap engaging said closed end of said outer tube for sealing said closed end, an inner tube base of cylindrical shape defining an outer periphery disposed in said first end of said inner tube and engaging said cap at said closed end of said outer tube, said inner tube base defining a central cavity of hollow cylindrical shape disposed concentrically in said inner tube base and open to said hydraulic chamber and closed by said cap and defining a plurality of radially disposed channels extending perpendicular to said center axis between said central cavity and said fluid chamber for establishing fluid communication between said hydraulic chamber and said fluid chamber, a piston disposed in sliding and sealing engagement with said inner tube inner wall in said hydraulic chamber, a rod guide of cylindrical shape defining an axial bore and disposed in said open end and in sealing engagement with said inner tube inner wall, a piston rod extending along said center axis and through said bore in said rod guide and connected to said piston for movement therewith, an inner clamp of annular shape holding said diaphragm radially inwardly into sealing engagement with said inner tube outer wall, said diaphragm extending from under said inner clamp and through a 'U' shaped turn back toward said open end along outer tube inner wall, an upper clamp of annular shape for holding said diaphragm into said outer tube inner wall for sealing said diaphragm to said outer tube inner wall.

2. An assembly as set forth in claim 1 further including a radially inwardly disposed waist defining an annular projection of said outer tube extending radially inwardly to define a sealing surface adjacent to said open end of said outer tube and said upper clamp being axially aligned with said waist for holding said diaphragm into said waist.

3. An assembly as set forth in claim 1 further including an annular shoulder receiving and abutting said first end of said inner tube with said outer periphery of said inner tube base being concentric with said inner tube outer wall.

4. A suspension damper assembly for an automotive shock absorber comprising;

an outer tube of cylindrical shape having an outer tube inner wall and an outer tube outer wall and extending concentrically about a center axis between an open end and a closed end, an inner tube of cylindrical shape having an inner tube inner wall and an inner tube outer wall and disposed concentrically about said center axis and disposed concentrically in said outer tube along said center axis between a first end and a second end, an annular flange disposed on said open end of said outer tube extending radially inwardly toward and perpendicular to said center axis to define an opening to said inner tube at said first end thereof, said inner tube inner wall being spaced radially from said center axis to define a hydraulic chamber of cylindrical shape, said inner tube outer wall being spaced radially from said outer tube inner wall to define a diaphragm chamber of cylindrical shape between said inner tube outer wall and said outer tube inner wall, a diaphragm of cylindrical shape disposed concentrically between said inner tube outer wall and said outer tube inner wall along said center axis for dividing said diaphragm chamber into a high pressure gas chamber disposed between said diaphragm and said inner tube outer wall and a fluid chamber disposed between said diaphragm and said outer tube inner wall, a gas charge seal disposed annularly in said high pressure gas chamber and having an 'S' shape abutting said annular flange and engaging said inner tube outer wall and said outer tube inner wall at said second end of said inner tube, said 'S' shape of said gas charge seal defining an inward groove opening annularly to said inner tube outer wall and an outward groove opening annularly to said outer tube inner wall, a first annular seal disposed in said inward groove in sealing engagement with said inner tube outer wall, a second annular seal disposed in said outward groove in sealing engagement with said inner tube outer wall, a cap engaging said closed end of said outer tube for sealing said closed end, an inner tube base of cylindrical shape defining an outer periphery disposed in said first end of said inner tube and engaging said cap at said closed end of said outer tube and defining an annular shoulder receiving and abutting said first end of said inner tube with said outer periphery of said inner tube base being concentric with said inner tube outer wall, said inner tube base defining a central cavity of hollow cylindrical shape disposed concentrically in said inner tube base and open to said hydraulic chamber and closed by said cap and defining a plurality of radially disposed channels extending perpendicular to said center axis between said central cavity and said fluid chamber for establishing fluid communication between said hydraulic chamber and said fluid chamber, a piston disposed in sliding and sealing engagement with said inner tube inner wall in said hydraulic chamber, a rod guide of cylindrical shape defining an axial bore and disposed in said open end and in sealing engagement with said inner tube inner wall, a piston rod extending along said center axis and through said bore in said rod guide and connected to said piston for movement therewith, a lower mounting member having a ring shape disposed along center axis on said closed end connected to said cap for receiving a mounting device, an upper mounting member having a ring shape disposed along center axis on said piston rod for receiving a mounting device, an inner clamp of annular shape holding said diaphragm radially inwardly into sealing engagement with said inner tube outer wall, said inner clamp axially overlapping said first end of said inner tube and said tube base at said shoulder, a radially inwardly disposed waist defining an annular projection of said outer tube extending radially inwardly to define a sealing surface adjacent to said open end of said outer tube, said diaphragm extending from under said inner clamp and through a 'U' shaped turn back toward said open end along outer tube inner wall and over said waist, an upper clamp of annular shape axially aligned with said waist for holding said diaphragm into said waist of said outer tube inner wall for sealing said diaphragm to said outer tube inner wall.

5. A method for assembling a suspension damper utilizing an inner tube, an outer tube, a diaphragm chamber disposed between the inner tube and the outer tube, a diaphragm disposed in the diaphragm chamber separating the diaphragm chamber into a high pressure gas chamber and a fluid chamber, said method comprising the steps of;

disposing one end of the diaphragm over a first end of the inner tube, sealing the diaphragm to the exterior of the inner tube adjacent the first end thereof to define an inner seal, rolling the diaphragm over the inner seal and towards a second end of the inner tube, inserting the inner tube and the diaphragm into an open end of the outer tube, fitting an upper clamp between the diaphragm and the inner tube, applying a crimp force to the outer tube to compress the outer tube and the diaphragm against the upper clamp and create a waist in the outer tube outer wall for sealing the diaphragm to the interior of the outer tube adjacent to the second end of the inner tube and sealing the high pressure gas chamber about the open end.

6. A method as set forth in claim 5 including sealing the diaphragm to the inner tube outer wall adjacent the first end thereof to define an inner seal placed on a shoulder between the inner tube and an inner tube base sealing the high pressure gas chamber about a closed end.

7. A method for assembling a suspension damper for an automotive shock absorber utilizing an inner tube defining a hydraulic chamber and an inner tube inner wall and an inner tube outer wall, an outer tube defining an outer tube inner wall and an outer tube outer wall, the inner tube having a first end and a second end and the outer tube having an open end and a closed end, the outer tube having an annular flange, a diaphragm chamber disposed between the inner tube outer wall and the outer tube inner wall, a diaphragm disposed in the diaphragm chamber and separating the diaphragm chamber into a high pressure gas chamber and a fluid chamber, an inner tube base containing a central cavity and a shoulder, a waist in the outer tube outer wall, a gas charge seal and a rod guide, a piston and a piston rod disposed in the hydraulic chamber, a cap and a lower mounting bracket and an upper mounting bracket, and an inner clamp and an upper clamp, said method comprising the steps of;

pressing the inner tube onto the inner tube base containing the central cavity about the first end of the inner tube, disposing one end of the diaphragm over the first end of the inner tube outer wall about the first end of the inner tube, sealing the diaphragm to the inner tube outer wall adjacent the first end thereof to define an inner seal placed on the shoulder between the inner tube and the inner tube base sealing the high pressure gas chamber about the closed end, rolling the diaphragm over the inner seal and towards the second end of the inner tube, inserting the inner tube and the inner tube base and the diaphragm into the open end of the outer tube, installing the cap and the lower mounting bracket to the closed end of the outer tube over the inner tube base sealing the closed end of the outer tube, lowering the upper clamp into the diaphragm chamber from the open end of the outer tube between the diaphragm and the inner tube outer wall, fitting the upper clamp to the diaphragm separating the high pressure gas chamber from the fluid chamber inside the diaphragm chamber, applying a crimp force to the outer tube outer wall compressing the outer tube and the diaphragm against the upper clamp sealing the high pressure gas chamber about the open end and creating a waist in the outer tube outer wall, installing the piston and the piston rod in the inner tube inner wall, filling the hydraulic chamber with a hydraulic fluid, charging the high pressure gas chamber with a compressed fluid, sealing the high pressure gas chamber by disposing the gas charge seal in the diaphragm chamber, closing the diaphragm chamber by rolling the annular flange of the outer tube inwardly to abut the inner tube and the gas charge seal, installing the upper mounting bracket to the piston rod on the open end, and filling the high pressure gas chamber with a compressed fluid.

* * * * *